2,940,894
Patented June 14, 1960

2,940,894
METHODS FOR CONTROLLING NEMATODES EMPLOYING AMINO-ISOBUTYRONITRILES

W E Craig, Philadelphia, and John O. Van Hook, Roslyn, Pa., assignors to Rohm & Haas Company, Philadelphia, Pa., a corporation of Delaware No Drawing. Filed Feb. 7, 1956, Ser. No. 563,835

7 Claims. (Cl. 167—22)

The present invention relates to an improved nematocide and to methods of employing it for the purpose of controlling infestations of nematodes or nemas in soil, especially that in which or adjacent to which cultivated crops or plants are growing or are to be planted.

At the present time, the most common materials used for this purpose are volatile or gaseous halogenated aliphatics or aromatics, such as dichloropropylenes. These materials have the disadvantage of damaging the rootlets of many types of live plants. In addition, because of their insolubility in water, they can only be applied satisfactorily by drilling into the soil.

In accordance with the present invention, it has been found that $\alpha$-aminoisobutyronitrile, $\alpha$-methylaminoisobutyronitrile, and $\alpha$-dimethylaminoisobutyronitrile are effective nematocides when introduced into soil infested with many types of nemas, eggs, and cysts, including the root knot nematodes of the genus Meloidogyne, the meadow or root lesion nematodes of the genus Pratylenchus, the stubby root nematodes of the genus Trichodorus, the sting nematodes (*Belonolaimus gracilis*), the bulb and stem nematodes of the genus Ditylenchus, the golden nematodes, the sugarbeet nematodes and the awl nematode. These nemas and others infest soils used in growing such crops as citrus fruits, tomatoes, potatoes, persimmons, pineapples, carrots, celery, beets, sugarbeets, corn, wheat, rye, oats, as well as many other economically important crops. The soil in which these crops may be grown may have a wide range of pH from a value of 3 to as high as a value of about 8, though for many crops the soil is preferably in a narrow pH range of about 4.5 to 6. These aminobutyronitriles are effective throughout this wide range of pH and they have the advantage of being soluble in water. Their water-solubility facilitates their application so that the rate of application to the soil can more easily be controlled. In addition, the water-solubility provides the additional avenue of application through irrigation water. These aminobutyronitriles have also fungicidal activity and they have been found to be generally non-phytotoxic on the roots of living plants when employed at a concentration on the soil where they are effective against the nematodes.

These aminobutyronitriles may be applied to the soil either in bulk or in solution in water. When applied as a solution, they may have a concentration of from 1% to 50% or more, and the aqueous solution may be employed as an irrigant for the crops when they are already growing in the soil. When used is the irrigant, they may be flowed over the area infested with the nematodes. These aminobutyronitriles may be introduced either in bulk or as an aqueous solution by injection through nozzles which are inserted into the soil to the desired depth from 1 inch to 12 inches, and the injection may be accompanied with a plowing operation wherein the nozzle or nozzles introduce the aminobutyronitriles or a solution thereof into the furrow made by the plow so that subsequent turning of the soil in making the next furrow covers the previous deposit of aminoisobutyronitrile. If desired, the soil area treated may subsequently be covered with a canvas or other cloth, but this is generally unnecessary.

These aminobutyronitriles may be employed in a wide range of concentrations on the weight of soil. Generally, a proportion of 5 to 100 parts per million on the weight of soil is adequate and it has been found that 20 to 50 parts per million serves to control most types of nematodes. Accordingly, the preferred rate of application is from 20 to 50 parts per million on the weight of soil. This in practice generally amounts to from 20 pounds to 800 pounds per acre depending upon the depth of soil to which treatment is carried, which may be up to 6 to 12 inches depending on the particular type of nemas involved. Preferably, from 100 to 300 pounds per acre are applied.

The following examples, in which the parts are by weight unless otherwise indicated, are illustrative of the invention:

Example 1

Pint jars are filled with soil heavily infested with root knot nemas and other pint jars are filled with soil heavily infested with sugarbeet nemas. $\alpha$-Aminoisobutyronitrile is applied into the center of the soil mass in each jar at a dosage of 0.05 ml. per pint. The jars are closed and stored for one week at 70° F. after which the soil is emptied into clay pots wherein they are left another week, tomato seedlings are transplanted thereinto and allowed to grow for 3 to 7 weeks. At the end of this period, the root system of the plant is washed clean and the number of galls per root system are counted in the jars or pots originally containing the root knot nematodes. Whereas three plants grown in a control sample of the soil have an average of 151 galls per plant, the plants in the treated soil show no galls whatsoever.

In the jars or pots originally containing the sugarbeet nematodes, the number of live females in a 50 ml. volume of soil is counted, being 152 (average of 3 jars) in a control soil and being reduced to 6 (average of 3 jars) in the case of the treated soil.

Example 2

The procedure of Example 1 is repeated, substituting $\alpha$-methylaminoisobutyronitrile for the $\alpha$-aminoisobutyronitrile there used and the same nematocidal effect is obtained.

Example 3

The procedure of Example 1 is repeated, substituting $\alpha$-dimethylaminoisobutyronitrile for the $\alpha$-aminoisobutyronitrile there used and the same nematocidal effect is obtained.

Example 4

When $\alpha$-dimethylaminoisobutyronitrile is dissolved in water at various concentrations, it shows an $LD_{50}$ at a concentration between 50 and 100 p.p.m. against *Stemphylium sarcinaeforme* and at a concentration of less than 5 p.p.m. against *Monilinia fructicola*. It is non-phytotoxic against tomatoes at a concentration of 0.1%.

It is to be understood that changes and variations may be made without departing from the spirit and scope of the invention as defined in the appended claims.

We claim:

1. A method of controlling nematode infestations of soil which comprises introducing $\alpha$-dimethylaminoisobutyronitrile into the soil infested with nematodes in an amount from 5 to 100 parts per million based on the weight of the soil.

2. A method of controlling nematode infestations of soil which comprises introducing $\alpha$-methylaminoisobutyronitrile into the soil infested with nematodes in an amount from 5 to 100 parts per million based on the weight of the soil.

3. A method of controlling nematode infestations of soil which comprises introducing α-aminoisobutyronitrile into the soil infested with namatodes in an amount from 5 to 100 parts per million based on the weight of the soil.

4. A method of controlling nematode infestations of soil which comprises introducing a compound selected from the group consisting of α-aminoisobutyronitrile, α-methylaminoisobutyronitrile, and α-dimethylaminoisobutyronitrile into the nematode-infested soil in an amount from 5 to 100 parts per million based on the weight of the soil.

5. A method of controlling nematode infestations of soil which comprises applying to a nematode-infested soil an aqueous irrigant containing a compound selected from the group consisting of α-aminoisobutyronitrile, α-methylaminoisobutyronitrile, and α-dimethylaminoisobutyronitrile, the amount of said compound applied being from 5 to 100 parts per million based on the weight of the soil.

6. A method of controlling nematode infestations of soil which comprises applying to the nematode-infested soil nematodes from 20 to 800 pounds of a compound selected from the group consisting of α-aminoisobutyronitrile, α-methylaminoisobutyronitrile, and α-dimethylaminoisobutyronitrile per acre of the soil.

7. A method of controlling nematode infestations of soil which comprises applying to the soil infested with the nematodes from 100 to 300 pounds of a compound selected from the group consisting of α-aminoisobutyronitrile, α-methylaminoisobutyronitrile, and α-dimethylaminoisobutyronitrile per acre of the soil.

References Cited in the file of this patent

UNITED STATES PATENTS

| | | |
|---|---|---|
| 1,982,909 | Flint | Dec. 4, 1934 |
| 2,057,044 | Meisenburg | Oct. 13, 1936 |
| 2,268,108 | Collie | Dec. 30, 1941 |
| 2,377,446 | Payne | June 5, 1945 |
| 2,419,073 | Hammer | Apr. 15, 1947 |
| 2,435,204 | Davidson | Feb. 3, 1948 |
| 2,448,265 | Kagy | Aug. 31, 1948 |
| 2,473,984 | Bickerton | June 21, 1949 |
| 2,502,244 | Carter | Mar. 28, 1950 |
| 2,543,580 | Kay | Feb. 27, 1951 |
| 2,726,485 | Thomas | Dec. 13, 1955 |
| 2,730,547 | Dye | Jan. 10, 1956 |
| 2,743,209 | Jones | Apr. 24, 1956 |
| 2,770,638 | Giolito | Nov. 13, 1956 |
| 2,779,680 | Wolf | Jan. 29, 1957 |
| 2,794,727 | Barrows | June 4, 1957 |

FOREIGN PATENTS

| | | |
|---|---|---|
| 124,387 | Australia | June 12, 1947 |

OTHER REFERENCES

Frear: Chem. of the Insecticides, Fungicides and Herbicides, 2nd ed., 1948, D. Van Nostrand, pp. 108–122.